United States Patent
Paterson et al.

(10) Patent No.: US 7,325,271 B2
(45) Date of Patent: Feb. 5, 2008

(54) CLAMP DEVICE FOR REMOVABLY ATTACHING A VACUUM CLEANER COMPONENT TO A STRUCTURE

(75) Inventors: Christopher M. Paterson, Biloxi, MS (US); Paul A. Moshenrose, Ocean Springs, MS (US); Terrance Montgomery Roberts, Fayetteville, AR (US)

(73) Assignee: Oreck Holdings, LLC, Cheyenne, WY (US)

( * ) Notice: Subject to any disclaimer, the term of this patent is extended or adjusted under 35 U.S.C. 154(b) by 745 days.

(21) Appl. No.: 10/700,875

(22) Filed: Nov. 4, 2003

(65) Prior Publication Data

US 2005/0091779 A1   May 5, 2005

(51) Int. Cl.
  *A47L 5/00* (2006.01)
(52) U.S. Cl. .......................... 15/246.2; 15/344; 269/86; 269/87.2; 269/900; 269/909; D8/73; D8/74
(58) Field of Classification Search ............... None
  See application file for complete search history.

(56) References Cited

U.S. PATENT DOCUMENTS

| | | | | |
|---|---|---|---|---|
| 1,999,600 A | * | 4/1935 | Stowell | ................... 269/157 |
| 3,872,538 A | * | 3/1975 | Crouser | ..................... 15/323 |
| 4,888,849 A | | 12/1989 | Hult et al. | |
| 5,294,063 A | | 3/1994 | Bote | |
| 5,524,321 A | | 6/1996 | Weaver et al. | |
| 5,722,110 A | | 3/1998 | McIntyre et al. | |
| 5,740,582 A | * | 4/1998 | Harrelson, II | ................ 15/315 |
| D410,785 S | | 6/1999 | Leasure et al. | |
| 6,009,595 A | | 1/2000 | Leasure et al. | |

\* cited by examiner

*Primary Examiner*—David Redding
(74) *Attorney, Agent, or Firm*—The Ollila Law Group LLC

(57) ABSTRACT

A clamp device for removably attaching a vacuum cleaner component to a structure according to an embodiment of the invention includes a clamp adapted to removably attach to the structure, a slot formed in the clamp, and a knob attached to the vacuum cleaner component. The knob slides into the slot of the clamp and the vacuum cleaner component is removably held in the clamp by the knob.

22 Claims, 5 Drawing Sheets

CLAMP DEVICE FOR REMOVABLY ATTACHING A VACUUM CLEANER COMPONENT TO A STRUCTURE

TECHNICAL FIELD

The present invention relates to a clamp device, and more particularly, to a clamp device for removably attaching a vacuum cleaner component to a structure.

BACKGROUND OF THE INVENTION

Vacuum cleaners are widely used for a variety of applications. A common use is in institutional cleaning, such as in office buildings or other buildings, restaurants, motels, industrial or agricultural facilities, etc. The vacuum cleaner can be an upright or canister floor model, can be a portable, hand-carry design, or can be a rolling industrial model, for example.

In an institutional cleaning application, a vacuum cleaner may be just one cleaning tool of many. As a result, in institutional use, a cleaning cart is commonly used to carry multiple items. However, a common cleaning cart typically does not have room for a vacuum cleaner. As a result, other cleaning items or tools are oftentimes left off of the cart in order to accommodate a vacuum cleaner. However, if such a cart can include a vacuum cleaner, the vacuum cleaner usually rides in the cart. Repeatedly lifting a vacuum cleaner a significant vertical distance up and into (and off of) such a cart is a waste of time and effort, and can cause fatigue and even injury. In addition, the person performing the lifting may have to arrange or move other items in the cart in order to insert the vacuum cleaner into the cart.

SUMMARY OF THE INVENTION

A clamp device for removably attaching a vacuum cleaner component to a structure according to an embodiment of the invention comprises a clamp adapted to removably attach to the structure, a slot formed in the clamp, and a knob attached to the vacuum cleaner component. The knob slides into the slot of the clamp and the vacuum cleaner component is removably held in the clamp by the knob.

A method of forming a clamp device for removably attaching a vacuum cleaner component to a structure according to an embodiment of the invention comprises providing a clamp adapted to removably attach to the structure, providing a slot formed in the clamp, and providing a knob attached to the vacuum cleaner component. The knob slides into the slot of the clamp and the vacuum cleaner component is removably held in the clamp by the knob.

BRIEF DESCRIPTION OF THE DRAWINGS

The same reference number represents the same element on all drawings. It should be noted that the drawings are not to scale.

DETAILED DESCRIPTION OF THE INVENTION

Figure 1:
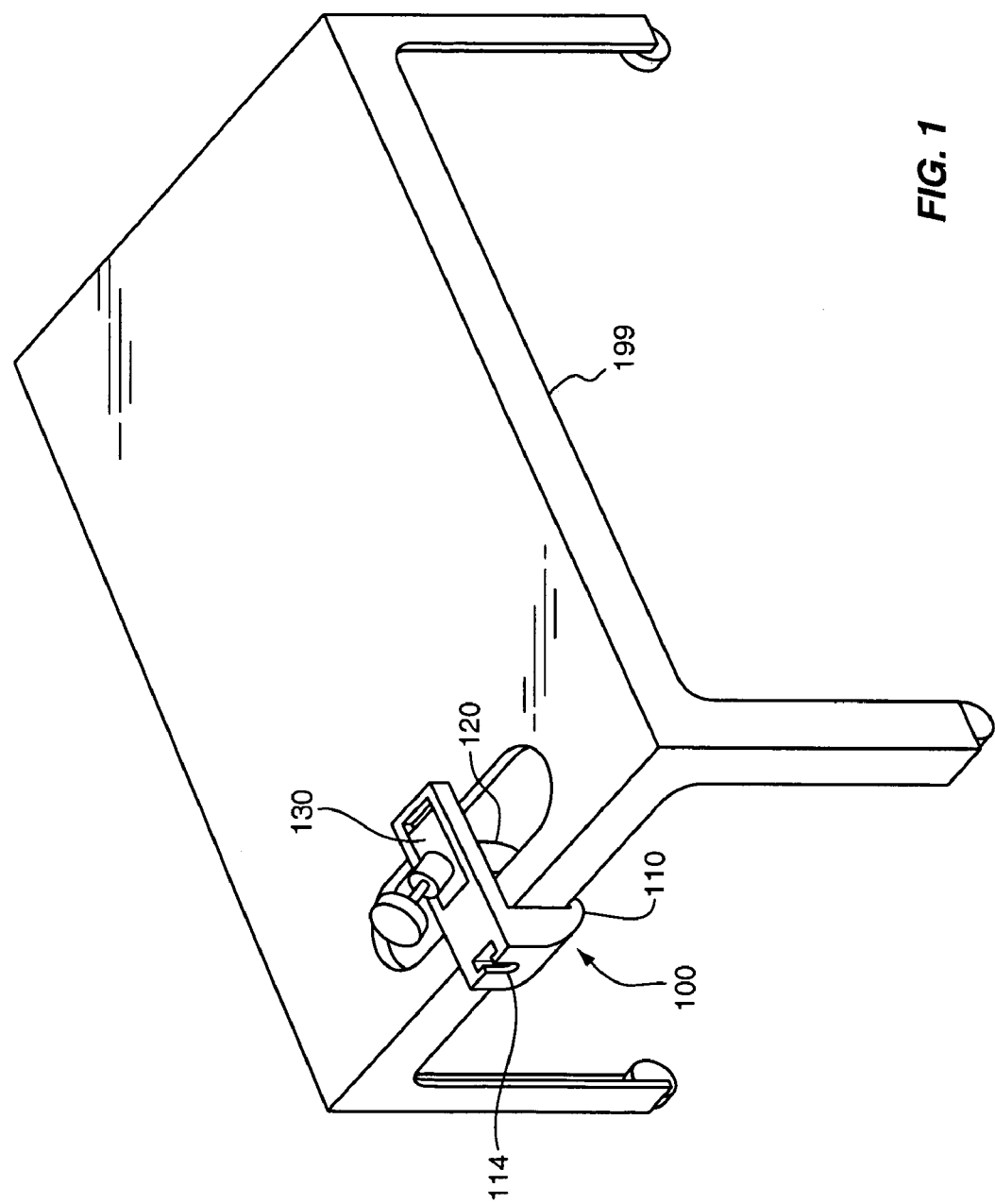
FIG. 1 shows a clamp of a clamp device according to an embodiment of the invention.

FIG. 1 shows a clamp 100 of a clamp device according to an embodiment of the invention. The clamp 100 is a component of the clamp device, and cooperates with a knob 201 (not shown, see FIG. 2) to attach a vacuum cleaner component 200 (also see FIG. 2) to a structure 199. The clamp 100 is capable of being removably attached to the structure 199. The knob 201 engages in and is held by the clamp 100, thereby holding the vacuum cleaner component 200 to the clamp 100 and to the structure 199. The clamp 100 and knob 201 can be affixed to the structure 199 so that a minimal amount of lifting and maneuvering is required in order to hang or remove the vacuum cleaner component 200.

The clamp 100 includes a clamp body 110, a slot 114 formed in the clamp body 110 and that receives the corresponding knob 201, a clamp jaw 120, and a slider 130. The knob 201 slides down into the slot 114, and thereby attaches the vacuum cleaner component 200 to the structure 199. The slider 130 cooperates with the clamp jaw 120 and tensions the clamp jaw 120 against the clamp body 110 in order to hold the clamp 100 to the structure 199 (see FIG. 3 and the accompanying discussion). It should be noted that the structure 199 can include multiple such clamps 100 in order to support and attach multiple vacuum cleaner components (i.e., one for a hose portion and one for a main vacuum cleaner unit, for example). Alternatively, the multiple clamps 100 can be used to attach and support multiple vacuum cleaners.

The vacuum cleaner component 200 (see FIG. 2) can comprise a component of a vacuum cleaner, such as a portion of a hose or wand, or a removable portion of a vacuum cleaner, such as a vacuum cleaner base, power portion, collection bin, etc. Alternatively, the vacuum cleaner component 200 can comprise an entire vacuum cleaner, including an upright or canister vacuum cleaner, a hand-carried portable vacuum cleaner, an industrial vacuum cleaner, or other specialized vacuum cleaner. In either embodiment, the previously mentioned knob 201 is attached to, or formed as a part of, the vacuum cleaner component 200.

The structure 199 can be any structure. The structure 199 can comprise a wall, a support member, or other structural member. The structure 199 can comprise a cart or other mobile device. In the embodiment shown, the structure 199 comprises a cart, such as a typical cleaning cart used in many types of cleaning applications. Alternatively, the structure 199 can comprise a utility cart, a trailer, or other rollable platform. In another embodiment, the structure 199 can be a powered vehicle.

Figure 2:
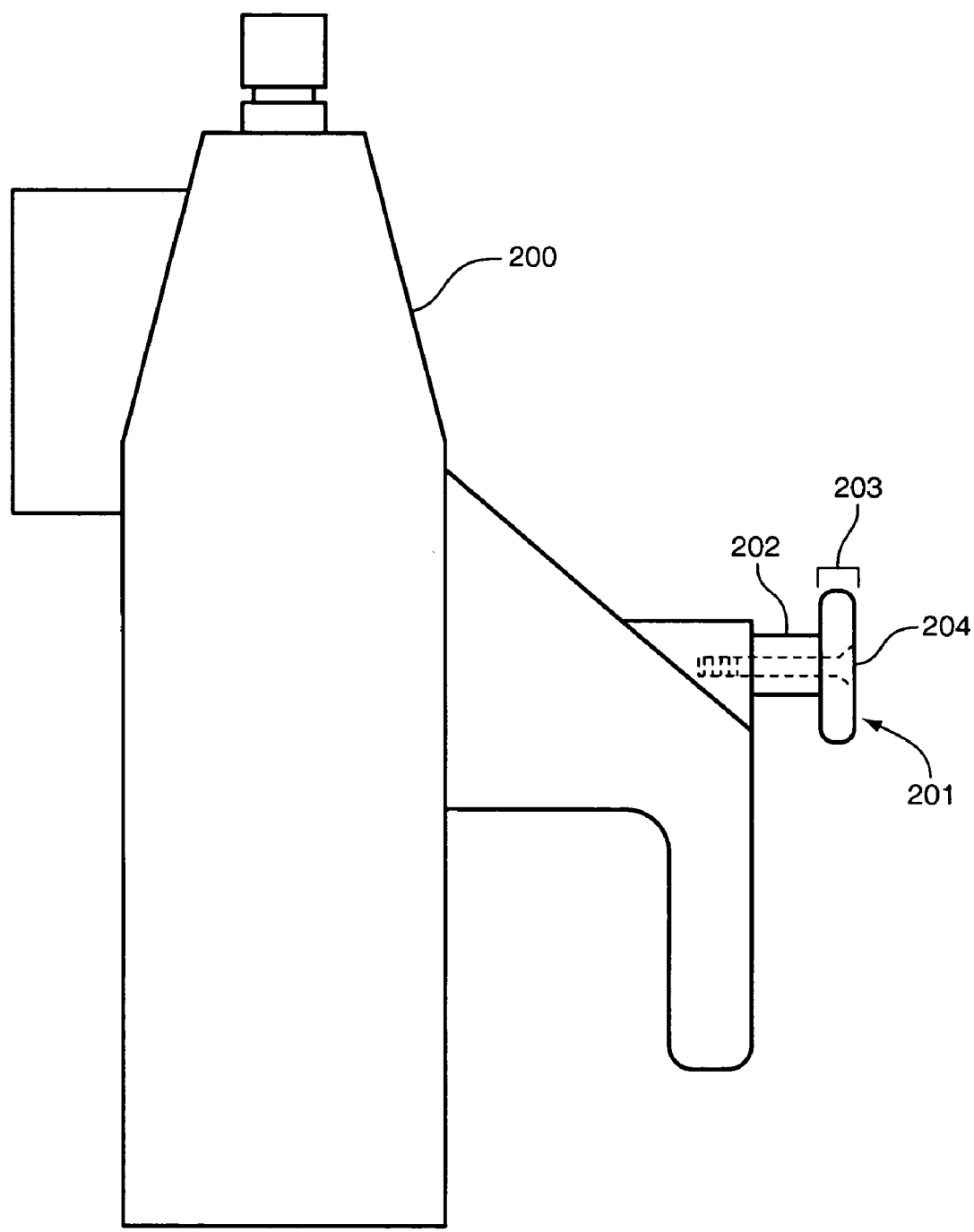
FIG. 2 shows detail of a knob that cooperates with the clamp.

FIG. 2 shows detail of the knob 201 that cooperates with the clamp 100. The knob 201 comprises a shaft 202 and a head portion 203 that is larger than the shaft 202. Both the shaft 202 and the head portion 203 can be substantially circular, although other shapes can be employed. The knob 201 can be affixed to the vacuum cleaner component 200, such as by a fastener 204. The fastener 204 can comprise any manner of fastener device, such as a screw, a bolt, a rivet, etc., and the knob 201 therefore can be removably attached to the vacuum cleaner component 200. Alternatively, the knob 201 can be formed as part of the vacuum cleaner component 200, or can be permanently affixed to the vacuum cleaner component 200 by a weld, adhesive, etc.

In one embodiment, the shaft 202 and the head portion 203 are substantially circular and the head portion 203 has a rounded profile, as shown. Consequently, the knob 201 can move somewhat in the slot 114 (i.e., a rocking or swiveling motion). This prevents excessive strain on the knob 201 or the clamp 100, and therefore reduces the likelihood of breakage of either component.

The knob 201 can be formed of any material. In one embodiment, the knob 201 is formed of an elastomeric material, such as rubber, for example. An elastomeric knob 201 will absorb impact loads and allow the vacuum cleaner component 200 to flex substantially in all directions in order to prevent damage to either the clamp 100 or to the knob 201.

Figure 3:
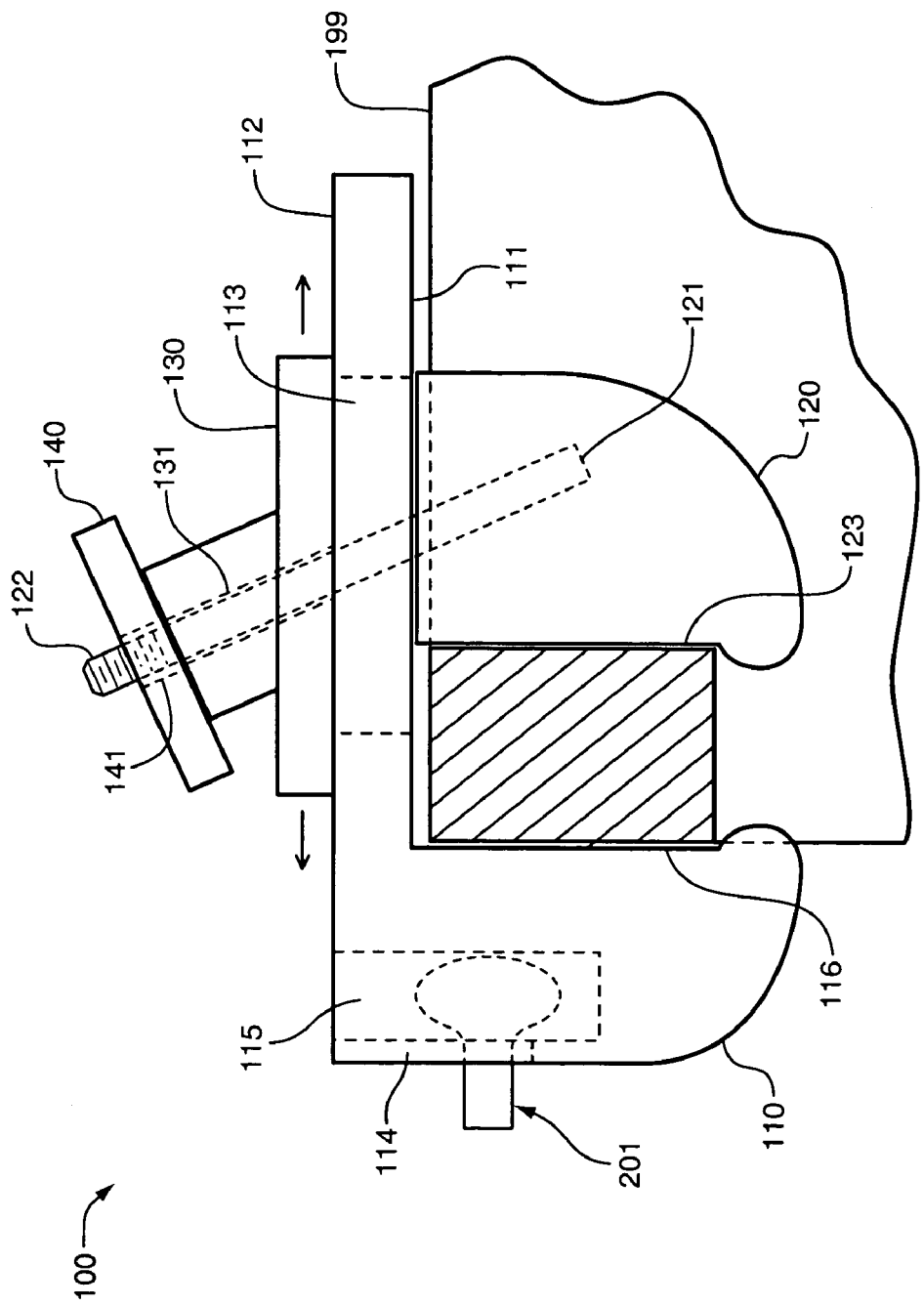
FIG. 3 shows a side view of the clamp and a portion of a structure.

FIG. 3 shows a side view of the clamp 100 and a portion of the structure 199. The clamp 100 includes the clamp body 110, the clamp jaw 120, and the slider 130. The clamp jaw 120 slides on a first side of the clamp body 110 and the slider 130 slides on a second side 112. In the embodiment shown, the first side comprises an underside 111 of the clamp body 110 and the second side comprises a top side, but other sides of the clamp body 110 can be used. This view illustrates how a clamp face 116 of the clamp body 110 and a clamp face 123 of the clamp jaw 120 cooperate to clamp to the structure 199. One or both of the clamp face 116 of the clamp body 110 and the clamp face 123 of the clamp jaw 120 can include serrations, ribs, texturing, or other raised features. The serrations, ribs, texturing, or other raised features can be provided in order to increase the holding power of the clamp 100. It should be understood that the clamp body length can be varied as necessary to accommodate the dimensions of the structure 199.

It can be seen from this figure that the clamp body 110 further includes the slot 114 and an inner slot 115. The slot 114 is sized to receive the shaft 202 of the knob 201 and the inner slot 115 is sized to receive the head portion 203. The inner slot 115 is therefore larger than the slot 114 and extends farther down in the clamp body 110 in order to receive the head portion 203 (see also FIG. 5). Both slots 114 and 115 are substantially vertically oriented in this figure, but can be positioned in other orientations, such as at an angle up from the horizontal or even horizontal (see FIG. 5 and the accompanying discussion). The slots 114 and 115 can include a predetermined clearance space, in order to allow the knob 201 to be easily inserted and removed. Moreover, the slots 114 and 115 can include the predetermined clearance space in order to allow the vacuum cleaner component 200 the ability to move somewhat when held by the clamp 100, in order to prevent excessive strain forces from being exerted on the clamp 100 and prevent excessive wear and breakage.

Figure 4:
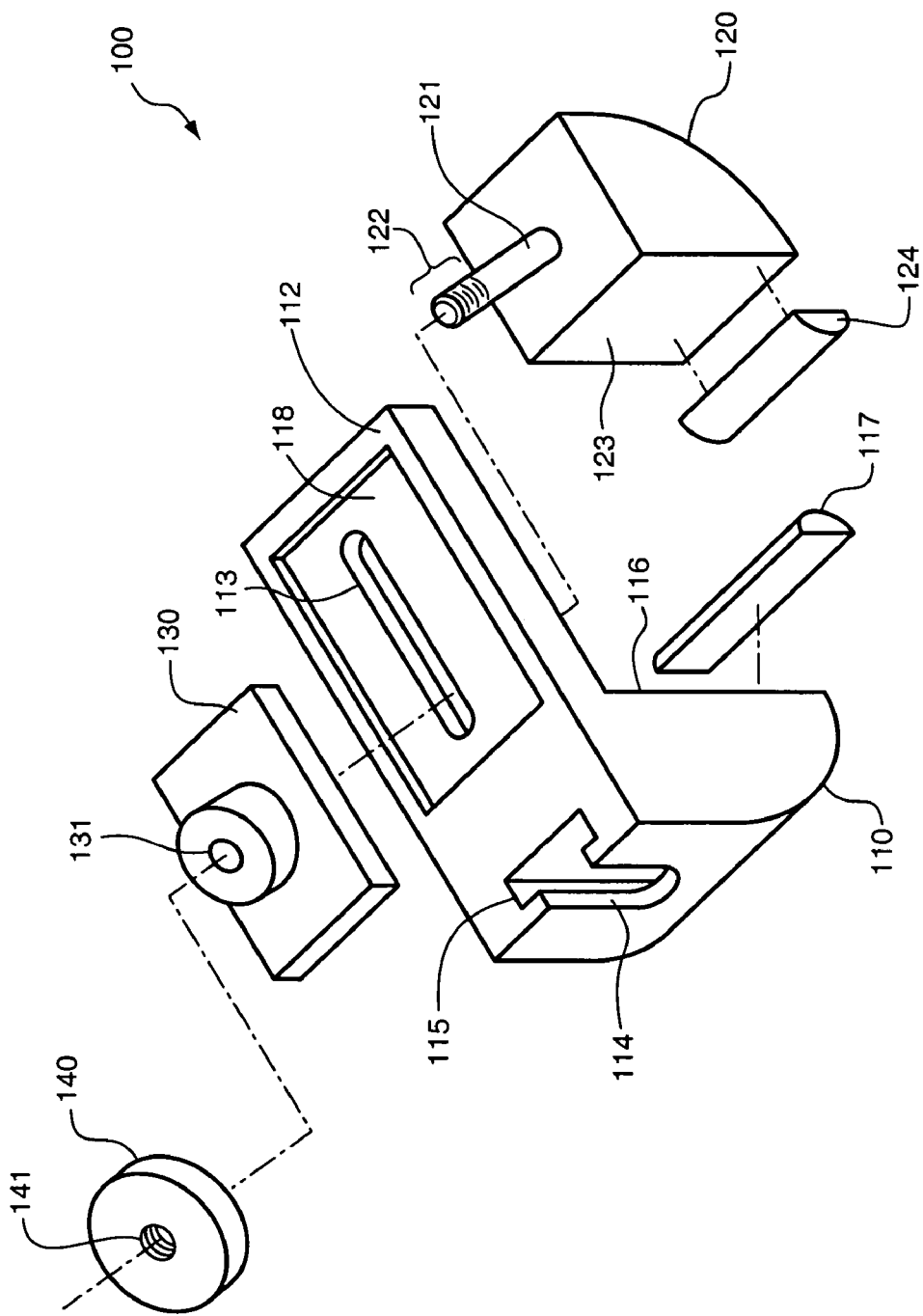
FIG. 4 is an exploded view of the clamp according to an embodiment of the invention.

The clamp body 110 further includes a slide slot 113 (see FIG. 4). The slider 130 rests on the clamp body 110 in a position over the slide slot 113 (see FIG. 4). The slide slot 113 receives a fastener 121 that clamps together the slider 130 and the clamp jaw 120. As a result, the clamp jaw 120 can be allowed to slide with respect to the clamp body 110 (see the arrows in the figure). One or both of the mating surfaces of the clamp jaw 120 and the clamp body 110 can include serrations, ribs, texturing, or other raised features. The serrations, ribs, texturing, or other raised features can be provided in order to increase the holding power of the clamp 100. In addition, the serrations, ribs, texturing, or other raised features can provide a ratcheting action to movement of the clamp jaw 120 with respect to the clamp body 110.

The slider 130 can be moved laterally with respect to the clamp body 110, thereby allowing the clamp jaw 120 to be clamped and released.

In the embodiment shown, the clamp jaw 120 includes an embedded fastener 121. The fastener 121 in this embodiment includes a threaded end 122, which is used to clamp together the slider 130 and the clamp jaw 120 on the clamp body 110. In addition, the slider 130 includes a bore 131 for the fastener 121. The bore 131 can be angled, as shown, in order to provide an improved clamping force on the clamp jaw 120. The fastener 121, after passing through the slide slot 113 and the bore 131, is engaged by a tensioning device 140 (discussed below in conjunction with the slider 130).

Alternatively, the tensioning device 140 and the fastener 121 are combined into one device. Consequently, a threaded bore can be provided in the clamp jaw 120. In another alternative, the clamp jaw 120 can include a bore and an embedded fastener or a fastener positioned on the exterior of the clamp jaw 120. As a result, the combined tensioning device 140 and fastener 121 engages either the threaded bore or the embedded/external fastener of the clamp jaw 120.

The tensioning device 140 includes an aperture 141 that engages the fastener 121. In the embodiment shown, the tensioning device 140 comprises a threaded hand wheel (i.e., the aperture 141 is threaded) that can be used to create the tensioning/clamping force between the clamp jaw 120 and the slider 130. Consequently, the tensioning device 140 can be rotated to increase or decrease a tension force between the slider 130 and the clamp jaw 120. In another embodiment (not shown), the tensioning device 140 includes the fastener 121 embedded therein, and the threaded end 122 of the fastener 121 engages a corresponding threaded aperture in the clamp jaw 120. Can also have 141 and 121 combined with a nut under 120 for tightening, or have 120 threaded in plastic to eliminate the need for a nut or other fastener.

The tensioning device 140 is capable of being hand-rotated. Consequently, the tensioning device 140 can include knurling, ridges, finger grooves, etc., to allow a person to firmly grip the tensioning device 140.

FIG. 4 is an exploded view of the clamp 100 according to an embodiment of the invention. This view shows the previously described components and includes several optional components.

An optional depression 118 can be formed in the clamp body 110, and operates to guide and constrain the movement of the slider 130. As a result, the slider 130 can move along with the clamp jaw 120, but cannot rotate and must move in the direction of the slide slot 113. Further, the depression 118 limits the travel of the slider 130. The depression 118 and/or the mating surface of the slider 130 can include serrations, ribs, texturing, or other raised features, as previously discussed.

It should be understood that a second depression (not shown) can be formed on the underside of the clamp body 110 and substantially opposite to the depression 118. This second depression likewise guides and constrains the sliding motion of the clamp jaw 120, and can include the previously discussed raised features.

The clamp 100 can further include pads 117 and 124 that are affixed to the clamp face 116 of the clamp body 110 and to the clamp face 123 of the clamp jaw 120, respectively. The pads 117 and 124 in one embodiment are formed of an elastomeric material, such as rubber, for example. However, other materials can be employed, including inflexible or hard materials, such as a metal, for example. The pads 117 and 124 prevent slippage of the clamp 100 when in a clamping configuration. Alternatively, the pads 117 and 124 can be formed as part of the clamp body 110 and clamp jaw 120. Furthermore, the clamping faces 116 and 123 can include any manner of features designed to improve gripping of the clamp 100, such as grooves and/or ridges, projections, roughening, etc.

Figure 5:
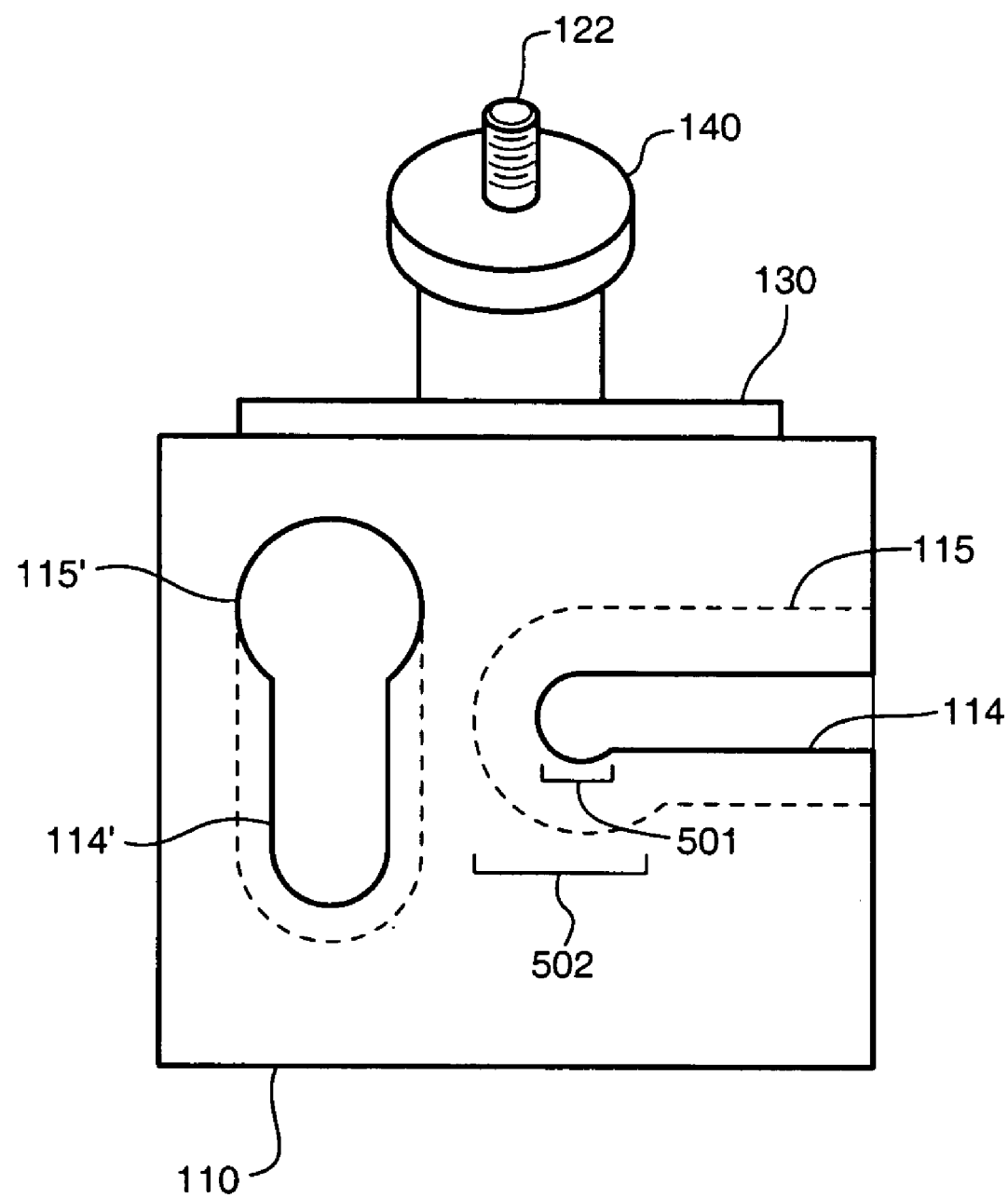
FIG. 5 shows an alternative embodiment of the clamp, wherein a slot and an inner slot are formed in a substantially horizontal orientation.

FIG. 5 shows an alternative embodiment of the clamp 100, wherein the slot 114 and the inner slot 115 are formed in a substantially horizontal orientation. The insertion and removal of the knob 201 and the vacuum cleaner component 200 in this embodiment can be accomplished with a horizontal motion. The advantage to this embodiment is that the vacuum cleaner component 200 does not have to be lifted an additional vertical amount for installation and removal, thereby lessening the effort required if the vacuum cleaner component 200 is relatively heavy and/or bulky.

The figure additionally shows a drooped portion 501 in the slot 114 and 502 in the inner slot 115. This drooped portion 501/502 can be included in order to prevent the knob 201 from sliding in the slot 114. The drooped portion 501/502 therefore prevents unintended movement of the knob 201 and the vacuum cleaner component 200. Alternatively, other shapes can be employed, such as a key shape, for example, that includes a slot 114' and an inner slot 115'. The various slot shapes and configurations can be employed in any desired orientation. Other retention methods and structures are also contemplated.

It should be understood that in addition to the embodiment of FIG. 5, the previously shown embodiment having a substantially vertical slot 114 can be mounted so that the slot 114 is horizontally oriented, such as on a leg or vertical member of the structure 199, for example.

It should also be understood that the clamp body 110 can comprise two portions. In such an embodiment, the slot 114 is formed in a front portion that is rotatably attached to the clamp body 110. Therefore, the front portion and slot 114 can be rotated to any desired position, and the clamp 100 does not have to be substantially horizontally mounted, as was shown in FIG. 1.

The clamp device according to any embodiment of the invention provides several benefits. The clamp device provides a convenient and easy to use apparatus for suspending or attaching a vacuum cleaner component to a structure (including an entire vacuum cleaner). The clamp device can accommodate vacuum cleaner components of various sizes, shapes, and weights. The structure can be, for example, a cart, such as a cleaning cart or utility cart. The clamp device can accommodate and clamp to various structures. The clamp device can be removably attached to a structure. The clamp device provides a stable fixture for attachment. The clamp device can be installed and removed by hand, with no need for tools. The clamp device can be positioned and oriented as desired. The clamp device allows for limited movement of the vacuum cleaner component in the clamp.

What is claimed is:

1. A clamp system adapted for removably attaching a vacuum cleaner component to a structure, the clamp system comprising:
   a clamp adapted to removably attach to the structure;
   a knob adapted to be attached to the vacuum cleaner component; and
   a slot formed in the clamp and configured to receive the knob;
   wherein the knob slides into the slot of the clamp and wherein the vacuum cleaner component is removably held in the clamp by the knob.

2. The clamp system of claim 1, wherein the clamp comprises:
   a clamp body;
   a clamp jaw that slides on a fast side of the clamp body;
   a slider that slides on a second side of the clamp body substantially opposite the clamp jaw; and
   a tensioning device that creates a tensioning force between the clamp jaw and the slider;
   wherein the clamp is adapted to clamp the structure between the clamp body and the clamp jaw by activation of the tensioning device.

3. The clamp system of claim 2, further comprising pads positioned on a clamp face of the clamp jaw and on a corresponding clamp face of the clamp body, wherein the pads oppose slippage of the clamp with respect to the structure.

4. The clamp system of claim 1, wherein the slot is substantially vertically oriented when the clamp is clamped to the structure.

5. The clamp system of claim 1, wherein the slot is substantially horizontally oriented when the clamp is clamped to the structure.

6. The clamp system of claim 1, wherein the knob comprises an elastomeric material.

7. The clamp system of claim 1, wherein the knob comprises rubber.

8. The clamp system of claim 1, wherein the knob is removably attached to the vacuum cleaner component.

9. The clamp system of claim 1, wherein the knob is permanently attached to the vacuum cleaner component.

10. The clamp system of claim 1, wherein the knob is formed as part of the vacuum cleaner component.

11. The clamp system of claim 1, wherein the vacuum cleaner component comprises a vacuum cleaner.

12. A method of forming a clamp system for removably attaching a vacuum cleaner component to a structure, the method comprising:
    providing a damp adapted to removably attach to the structure;
    providing a slot formed in the clamp; and
    providing a knob attached to the vacuum cleaner component;
    wherein the knob slides into the slot of the clamp and wherein the vacuum cleaner component is removably held in the clamp by the knob.

13. The method of claim 12, wherein providing the clamp comprises:
    providing a clamp body;
    providing a clamp jaw that slides on a first side of the clamp body;
    providing a slider that slides on a second side of the clamp body substantially opposite the clamp jaw; and
    providing a tensioning device that creates a tensioning force between the clamp jaw and the slider;
    wherein the clamp is adapted to clamp the structure between the clamp body and the clamp jaw by activation of the tensioning device.

14. The method of claim 13, further comprising providing pads positioned on a clamp face of the clamp jaw and on a corresponding clamp face of the clamp body, wherein the pads oppose slippage of the clamp with respect to the structure.

15. The method of claim 12, wherein the slot is substantially vertically oriented when the clamp is clamped to the structure.

16. The method of claim 12, wherein the slot is substantially horizontally oriented when the clamp is clamped to the structure.

17. The method of claim 12, wherein the knob comprises an elastomeric material.

18. The method of claim 12, wherein the knob comprises rubber.

19. The method of claim 12, wherein the knob is removably attached to the vacuum cleaner component.

20. The method of claim 12, wherein the knob is permanently attached to the vacuum cleaner component.

21. The method of claim 12, wherein the knob is formed as part of the vacuum cleaner component.

22. The method of claim 12, wherein the vacuum cleaner component comprises a vacuum cleaner.

* * * * *